US008884924B2

(12) United States Patent
Kawaguchi et al.

(10) Patent No.: US 8,884,924 B2
(45) Date of Patent: Nov. 11, 2014

(54) INFORMATION PROCESSING APPARATUS, INFORMATION PROCESSING METHOD, INFORMATION RECORDING MEDIUM, AND PROGRAM

(75) Inventors: Satoshi Kawaguchi, Kanagawa (JP); Yuji Takeuchi, Saitama (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 362 days.

(21) Appl. No.: 13/121,321

(22) PCT Filed: Oct. 1, 2009

(86) PCT No.: PCT/JP2009/067142
§ 371 (c)(1),
(2), (4) Date: May 20, 2011

(87) PCT Pub. No.: WO2010/038822
PCT Pub. Date: Apr. 8, 2010

(65) Prior Publication Data
US 2011/0210947 A1    Sep. 1, 2011

(30) Foreign Application Priority Data
Oct. 1, 2008    (JP) .................................. 2008-256598

(51) Int. Cl.
G06F 3/042    (2006.01)
G06F 3/0484    (2013.01)
A63F 13/40    (2014.01)
G06F 3/0488    (2013.01)
G06F 3/03    (2006.01)
A63F 13/219    (2014.01)

(52) U.S. Cl.
CPC ............ *A63F 13/10* (2013.01); *G06F 3/04847* (2013.01); *A63F 2300/204* (2013.01); *A63F 2300/1087* (2013.01); *G06F 3/0488* (2013.01); *A63F 2300/6045* (2013.01); *G06F 3/0304* (2013.01); *A63F 13/04* (2013.01); *A63F 2300/1075* (2013.01); *G06F 2203/04101* (2013.01)

USPC .......................................................... 345/175

(58) Field of Classification Search
None
See application file for complete search history.

(56) References Cited

U.S. PATENT DOCUMENTS 6,191,773 B1 *  2/2001  Maruno et al. ................. 345/158
6,385,331 B2 *  5/2002  Harakawa et al. ............ 382/106
(Continued)

FOREIGN PATENT DOCUMENTS

EP    1659538 A1    5/2006
EP    1970863 A1    9/2008
(Continued)

OTHER PUBLICATIONS

International Preliminary Report on Patentability and Written Opinion for corresponding PCT application PCT/JP2009/067142, dated May 19, 2011.

(Continued)

*Primary Examiner* — Joseph Haley
*Assistant Examiner* — Emily Frank
(74) *Attorney, Agent, or Firm* — Matthew B. Dernier, Esq.; Gibson & Dernier LLP

(57) ABSTRACT

To provide an information processing apparatus having a user interface for enabling a user to readily give an instruction. A distance distribution image obtaining unit obtains a distance distribution image produced based a measured result output from a distance distribution measuring unit for measuring distance distribution to an object within a predetermined view field. An instruction content data producing unit produces instruction content data, based on the distance distribution image. An information processing execution unit obtains the instruction content data produced by the instruction content data producing unit, and carries out information processing based on the instruction content data.

7 Claims, 13 Drawing Sheets

(56) References Cited

U.S. PATENT DOCUMENTS

| | | | |
|---|---|---|---|
| 7,411,575 B2 | 8/2008 | Hill | |
| 7,525,050 B1 * | 4/2009 | Weaver et al. | 178/18.04 |
| 8,164,577 B2 | 4/2012 | Tsuzaki | |
| 8,249,334 B2 * | 8/2012 | Berliner et al. | 382/154 |
| 2002/0041327 A1 | 4/2002 | Hildreth | |
| 2003/0000458 A1 | 1/2003 | Marumo | |
| 2005/0057524 A1 | 3/2005 | Hill | |
| 2006/0061584 A1 * | 3/2006 | Kristiansen | 345/582 |
| 2008/0009348 A1 | 1/2008 | Zalewski | |
| 2008/0018595 A1 * | 1/2008 | Hildreth et al. | 345/156 |
| 2008/0080789 A1 | 4/2008 | Marks | |
| 2008/0252641 A1 * | 10/2008 | Masumoto et al. | 345/424 |
| 2009/0073117 A1 * | 3/2009 | Tsurumi et al. | 345/158 |
| 2009/0122007 A1 | 5/2009 | Tsuzaki | |
| 2010/0164891 A1 | 7/2010 | Hill | |
| 2010/0259546 A1 * | 10/2010 | Yomdin et al. | 345/473 |

FOREIGN PATENT DOCUMENTS

| | | | |
|---|---|---|---|
| GB | 2425910 A | 11/2006 | |
| JP | 05324181 A | 12/1993 | |
| JP | 07057103 A | 3/1995 | |
| JP | 07160412 A | 6/1995 | |
| JP | 07334299 A | 12/1995 | |
| JP | 2000163193 A | 6/2000 | |
| JP | 2003522708 A | 7/2003 | |
| JP | 2003295990 A | 10/2003 | |
| JP | 2005108211 A | 4/2005 | |
| JP | 2008117371 A | 5/2008 | |
| JP | 2008225985 A | 9/2008 | |
| JP | 2009116769 A | 5/2009 | |
| WO | 02103436 A2 | 12/2002 | |

OTHER PUBLICATIONS

Office Action for corresponding Chinese patent Application No. 200980138871.7, dated Jan. 14, 2013.

International Search Report for corresponding PCT application PCT/JP2009/067142, dated Dec. 28, 2009.

Office Action for corresponding Japanese Patent Application No. 2010-531901, dated on May 14, 2013.

Office Action for corresponding Japanese Patent Application No. 2010-531901, dated on Nov. 26, 2013.

Office Action for corresponding Chinese Patent Application No. 200980138871.7, dated on Nov. 13, 2013.

European Search Report for corresponding EP Patent Application No. 09817854.4, dated on Feb. 4, 2014.

* cited by examiner

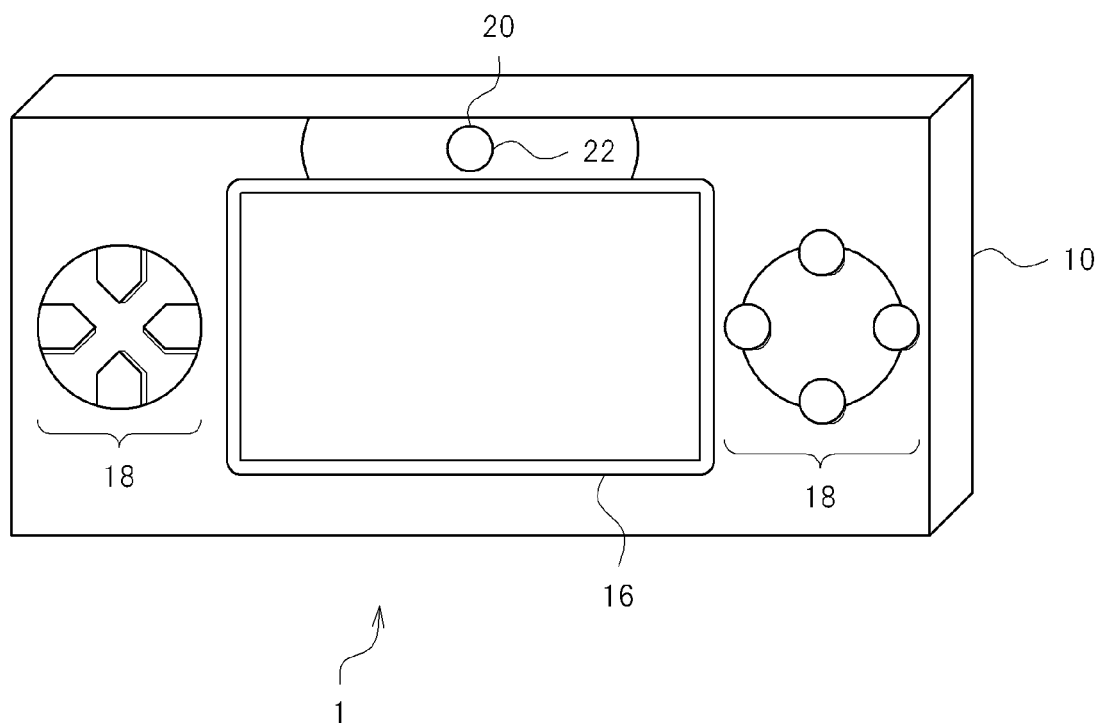
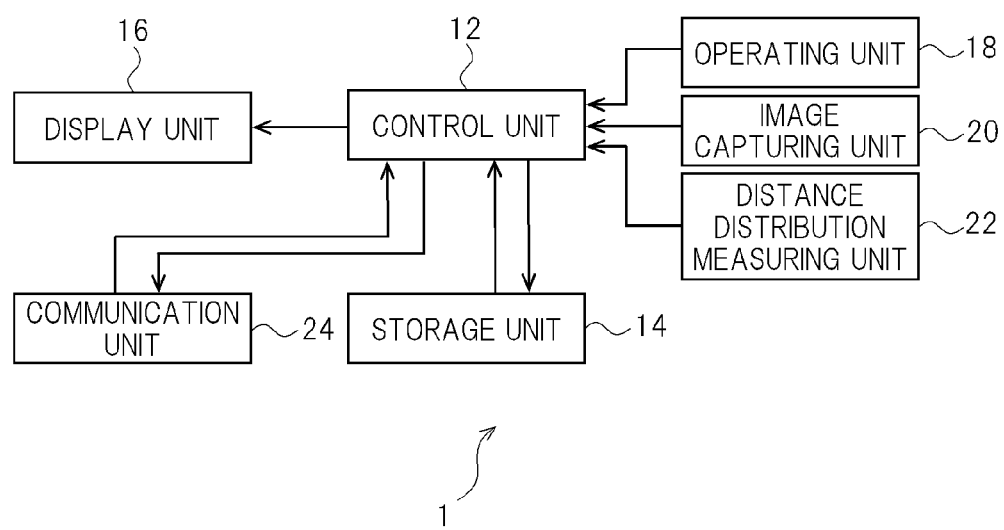

INFORMATION PROCESSING APPARATUS, INFORMATION PROCESSING METHOD, INFORMATION RECORDING MEDIUM, AND PROGRAM

TECHNICAL FIELD

The present invention relates to an information processing apparatus, an information processing method, an information storage medium, and a program.

BACKGROUND ART

Portable information processing apparatuses having user interfaces for receiving user instructions have been available. For example, a user can give an instruction to the information processing apparatus by pressing a button or touching a touch pad, so that the information processing apparatus carries out information processing in accordance with the instruction.

SUMMARY OF THE INVENTION

To give an instruction, however, a user needs to operate an operating member, such as a button or a touch pad. Therefore, it is not easy to give an instruction to the information processing apparatus in a situation in which it is not easy to operate an operating member. This is not limited to portable information processing apparatuses but generally applied to information processing apparatuses.

The present invention has been conceived in view of the above, and an object thereof is to provide an information processing apparatus having a user interface for enabling a user to readily give an instruction, an information processing method, an information storage medium, and a program.

In order to solve the above described problems, an information processing apparatus according to the present invention is an information processing apparatus for obtaining instruction content data describing content of a user instruction and for carrying out information processing based on the instruction content data, comprising a distance distribution image obtaining unit for obtaining a distance distribution image produced based on a measured result output from a distance distribution measuring unit for measuring distance distribution to an object within a predetermined view field, the distance distribution image showing the distance distribution; an instruction content data producing unit for producing the instruction content data, based on the distance distribution image; and an information processing executing unit for obtaining the instruction content data produced by the instruction content data producing unit and for carrying out information processing based on the instruction content data.

Further, an information processing method according to the present invention is an information processing method for obtaining instruction content data describing content of a user instruction and for carrying out information processing based on the instruction content data, comprising a distance distribution image obtaining step of obtaining a distance distribution image produced based on a measured result output from a distance distribution measuring unit for measuring distance distribution to an object within a predetermined view field, the distance distribution image showing the distance distribution; an instruction content data producing step of producing the instruction content data, based on the distance distribution image; and an information processing executing step of obtaining the instruction content data produced by the instruction content data producing unit and for carrying out information processing based on the instruction content data.

Further, an information storage medium according to the present invention is an information storage medium storing a program for causing a computer to function as an information processing apparatus for obtaining instruction content data describing content of a user instruction and for carrying out information processing based on the instruction content data, the program for causing the computer to function as a distance distribution image obtaining unit for obtaining a distance distribution image produced based on a measured result output from a distance distribution measuring unit for measuring distance distribution to an object within a predetermined view field, the distance distribution image showing the distance distribution; an instruction content data producing unit for producing the instruction content data, based on the distance distribution image; and an information processing executing unit for obtaining the instruction content data produced by the instruction content data producing unit and for carrying out information processing based on the instruction content data.

Further, a program according to the present invention is a program for causing a computer to function as an information processing apparatus for obtaining instruction content data describing content of a user instruction and for carrying out information processing based on the instruction content data, the program for causing the computer to function as a distance distribution image obtaining unit for obtaining a distance distribution image produced based on a measured result output from a distance distribution measuring unit for measuring distance distribution to an object within a predetermined view field, the distance distribution image showing the distance distribution; an instruction content data producing unit for producing the instruction content data, based on the distance distribution image; and an information processing executing unit for obtaining the instruction content data produced by the instruction content data producing unit and for carrying out information processing based on the instruction content data.

According to the present invention, as the information processing apparatus carries out information processing based on a measured result by the distance distribution measuring unit, a user can readily give an instruction to the information processing apparatus.

According to one aspect of the present invention, the information processing apparatus may further comprise an area specifying unit for specifying an area in the distance distribution image, the area related to a distance shown in the distance distribution image and satisfying a predetermined condition, wherein the instruction content data producing unit may produce the instruction content data, based on a position of the area specified by the area specifying unit in the distance distribution image. With the above, it is possible to carry out information processing, based on an area in the distance distribution area, the area related to a distance shown in the distance distribution image and satisfying a predetermined condition.

According to this aspect, the area specifying unit may specify, as to each of a plurality of predetermined conditions, an area in the distance distribution image, the area related to a distance shown in the distance distribution image and satisfying the predetermined condition, and the instruction content data producing unit produces the instruction content data, based on the position of each area specified by the area specifying unit in the distance distribution image. With the above, the information processing apparatus can carry out information processing, based on a plurality of areas in the distance distribution image. This can readily widen the variation a user can impart to the information processing apparatus.

According to another aspect of the present invention, the distance distribution image obtaining unit may sequentially obtain the distance distribution image produced based on the measured result sequentially output from the distance distribution measuring unit for sequentially measuring the distance distribution, and the instruction content data producing unit may produce the instruction content data, based on a difference between two or more distance distribution images. With the above, the information processing apparatus can carry out information processing, based on a difference in distribution of distances measured at different time. This can readily widen the variation a user can impart to the information processing apparatus.

BRIEF DESCRIPTION OF THE DRAWINGS

FIG. 1 is a perspective view showing one example of a portable game device according to one embodiment of the present invention;

FIG. 2 is a hardware structure diagram showing one example of a hardware structure of a portable game device according to one embodiment of the present invention;

DETAILED DESCRIPTION OF THE PREFERRED EMBODIMENTS

Figure 3:
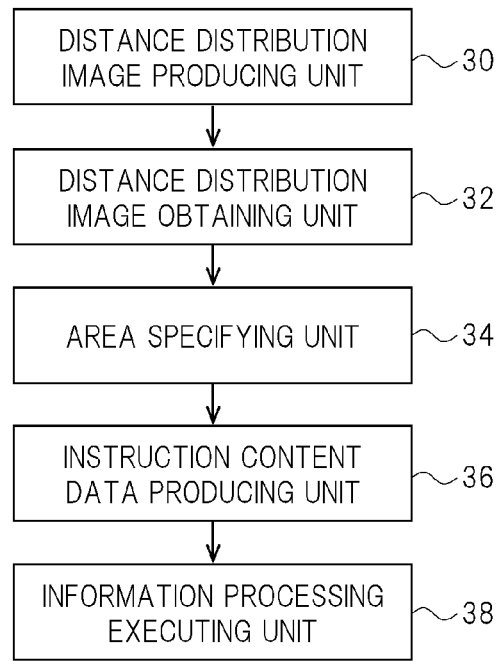
FIG. 3 is a functional block diagram of a portable game device according to one embodiment of the present invention.

In the following, one embodiment of the present invention will be described in detail with reference to the accompanying drawings.

FIG. 1 is a perspective view showing one example of a portable game device 1 according to this embodiment. FIG. 2 is a diagram showing one example of a hardware structure of the portable game device 1 shown in FIG. 1. As shown in FIGS. 1 and 2, the housing 10 of the portable game device 1 according to this embodiment is shaped like a box. The portable game device 1 according to this embodiment comprises a control unit 12, a storage unit 14, a display unit 16, an operating unit 18, an image capturing unit 20, a distance distribution measuring unit 22, and a communication unit 24.

The control unit 12 is a program control device, such as a CPU, and operates according to a program (e.g., a game program) stored in the storage unit 14.

The storage unit 14 is a storage element, such as a RAM, a hard disk drive, or the like, and a program and so forth to be executed by the control unit 12 is stored in the storage unit 14. Specifically, for example, a game program to be executed by the control unit 12 is stored. The storage unit 14 functions also as a working memory of the control unit 12.

The display unit 16 is, e.g., a liquid crystal display or the like, and displays an image according to an instruction from the control unit 12. In this embodiment, the display unit 16 is provided in the middle of the front surface of the housing 10 of the portable game device 1. The control unit 12 may additionally designate to the display unit 16, attributes, such as resolution, an aspect ratio, and so forth, of an image shown. Further, the control unit 12 may designate to the display unit 16, attributes of an image that is shown on the display unit 16 according to the content of attribute information relating to image resolution, an aspect ratio of an image, and so forth, contained in a program carried out.

The operating unit 18 is e.g., an operating member (specifically, e.g., a cross key or a button), and outputs output data in accordance with an operation carried out on the operating member to the control unit 12. Having obtained the output data output from the operating unit 18, the control unit 12 carries out a process, using the output data, in accordance with the player operation carried out on the operating member. In this embodiment, the operating unit 18 is provided on the left and right respective sides of the display unit 16 of the portable game device 1. That is, the operating unit 18 is provided separately on the left and right respective sides on the front surface of the housing 10 of the portable game device 1.

The image capturing unit 20 comprises, e.g., a publicly known digital camera, and produces a black/white, grey scaled, or colored image (e.g., a JPEG image) every predetermined period of time (e.g., 1/60th of a second). The image capturing unit 20 may be either of a normal camera, a telephoto camera, and a wide-angle camera. In the embodiment, the image capturing unit 20 is provided on the upper side of the display unit 16. That is, the image capturing unit 20 is provided on an upper part near the middle of the front surface of the housing 10.

The distance distribution measuring unit 22 measures distribution of a distance to an object within a predetermined view field. In this embodiment, the view field of the distance distribution measuring unit 22 corresponds to that of the image capturing unit 20. Specifically, the distance distribution measuring unit 22 measures distribution of a distance between, e.g., a plane surface constituted by the front surface of the portable game device 1 and an object (more specifically, e.g., the length of a normal extending from an object to the plane surface constituted by the front surface of the portable game device 1). In this embodiment, the distance distribution measuring unit 22 measures distribution of a distance to an object shown in an image produced by the image capturing unit 20 every predetermined period of time (e.g., 1/60th of a second). Note that the distance distribution measuring unit 22 may measure, as to each area (or each pixel) included in an image produced by the image capturing unit 20, distribution of a distance to the surface of an object corresponding to the area (or the pixel). In this embodiment, the distance distribution measuring unit 22 sequentially outputs a measured result.

The distance distribution measuring unit 22 is specifically, e.g., a stereo camera comprising a plurality of lenses, and measures distribution of a distance between the portable game device 1 and an object, based on the parallaxes of the respective lenses. Note that the distance distribution measuring unit 22 is not limited to the stereo camera. The distance distribution measuring unit 22 may output infrared radiation, measure a period of time elapsing between the output of infrared radiation and the return of the output infrared radiation after being reflected by an image capturing object, and measure the distance between the portable game device and the object, based on the measured period of time. Alternatively, the distance distribution measuring unit 22 may comprise a plurality of lenses having different focal distances, and measure distribution of a distance between the portable game device 1 and an object, relying on the lens that is focused on the object among these lenses. Note that, in this embodiment, the distance distribution measuring unit 22 is formed integral to the image capturing unit 20, and provided on the upper side of the display unit 16. That is, the distance distribution measuring unit 22 is provided on an upper part near the middle of the front surface.

The communication unit 24 is, e.g., a network interface or the like (specifically, e.g., a wireless LAN module), and sends information to another portable game device 1, a server (not shown) on the Internet, or the like, according to an instruction input from the control unit 12. Further, the communication unit 24 outputs received information to the control unit 12.

In the following, functions realized by the control unit 12 of the portable game device 1 according to this embodiment will be described. FIG. 3 is a functional block diagram of the portable game device 1 according to this embodiment. As shown in FIG. 3, the portable game device 1 according to this embodiment functionally comprises a distance distribution image producing unit 30, a distance distribution image obtaining unit 32, an area specifying unit 34, an instruction content data producing unit 36, and an information processing executing unit 38. These elements are realized by executing a program installed in the portable game device 1, which is a computer, by the control unit 12, such as a CPU or the like, included in the portable game device 1. Note that the program is supplied to the portable game device 1 via a computer readable information transmitting medium, e.g., a CD-ROM, a DVD-ROM, and so forth, or a communication network, such as the Internet, or the like.

Figure 4:
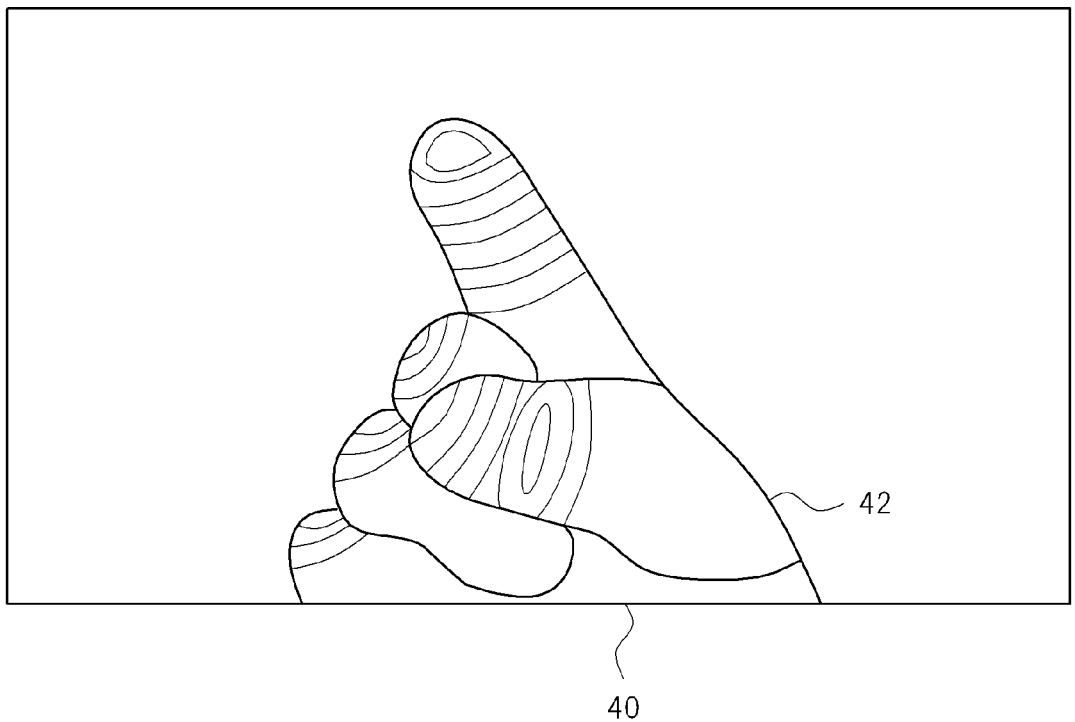
FIG. 4 is a diagram showing one example of a distance distribution image.

The distance distribution image producing unit 30 produces a distance distribution image 40 (see FIG. 4) showing distribution of distances to an object, based on a measured result output from the distance distribution measuring unit 22. FIG. 4 is a diagram showing one example of the distance distribution image 40. In the distance distribution image 40 shown in FIG. 4, distribution of the distance from the portable game device 1 to the user's hand (a user distance d), measured by the distance distribution measuring unit 22, is expressed by means of contour lines. Obviously, a method for expressing the distance distribution image 40 is not limited to the above. In this embodiment, the distance distribution image producing unit 30 sequentially produces the distance distribution image 40, based on a measured result of distance distribution sequentially output by the distance distribution measuring unit 22.

Note that the distance distribution image producing unit 30 may produce distance distribution image 40 that correlates each area (or each pixel) included in an image produced by the image capturing unit 20 to a distance between the portable game device 1 and a point on an object, corresponding to the area (or the pixel).

The distance distribution image obtaining unit 32 obtains the distance distribution image 40 produced by the distance distribution image producing unit 30. In this embodiment, the distance distribution image obtaining unit 32 sequentially obtains the distance distribution image 40.

Figure 5:
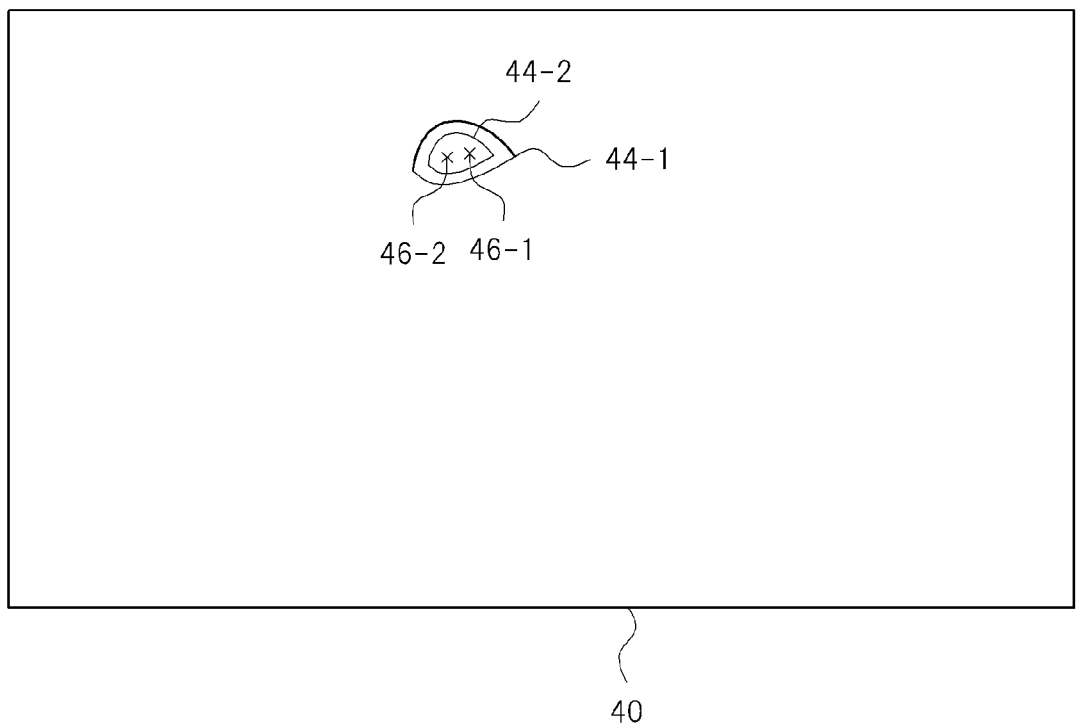
FIG. 5 is a diagram showing one example of specific areas in the distance distribution image.

The area specifying unit 34 specifies an area in the distance distribution image 40 (hereinafter referred to as a specific area 44), the area related to a distance shown in the distance distribution image 40 and satisfying a predetermined distance condition (see FIG. 5). Note that, as to a plurality of conditions, the area specifying unit 34 may specify a specific area 44 that satisfies either of the plurality of conditions. In this embodiment, the area specifying unit 34 specifies a first specific area 44-1 related to the user distance d being equal to or smaller than Z1 and a second specific area 44-2 related to the user distance d being equal to or smaller than Z2 (Note that Z1>Z2). FIG. 5 is a diagram showing one example of the first specific area 44-1 and the second specific area 44-2 in the distance distribution image 40 shown in FIG. 4.

In this embodiment, the area specifying unit 34 sequentially specifies a specific area 44 in the distance distribution images sequentially obtained by the distance distribution image obtaining unit 32 (the first specific area 44-1 and the second specific area 44-2), and then sequentially specifies a specific area representative point 46 representing each of the specific areas 44 (specifically, e.g., a first specific area representative point 46-1 corresponding to the center of gravity of the first specific area 44-1 and a second specific area representative point 46-2 corresponding to the center of gravity of the second specific area 44-2) (see FIG. 5). Note that the specific area representative point 46 is not limited to the center of gravity of the specific area 44.

The area specifying unit 34 may produce specific area representative point position data that indicates the position of the specific area representative point 46 in the distance distribution image 40. In this embodiment, the area specifying unit 34 produces specific area representative point position data that contains the first specific area representative point position data and the second specific area representative point position data.

When no area in the distance distribution image 40 satisfies a predetermined condition, that is, when no specific area 44 is specified by the area specifying unit 34, the area specifying unit 34 may produce specific area representative point position data that indicates absence of the specific area 44. In this embodiment, when no area corresponding to the first specific area 44-1 (or the second specific area 44-2) is present in the distance distribution image 40, the area specifying unit 34 produces first specific area representative point position data (or second specific area representative point position data) that indicates absence of the first specific area 44-1 (or second specific area 44-2).

Figure 6:
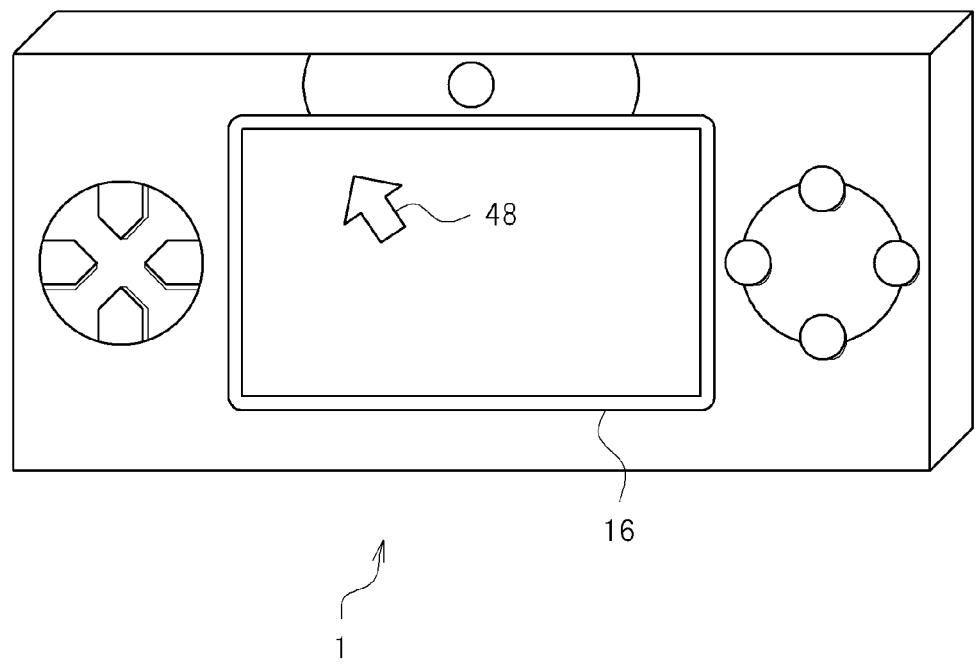
FIG. 6 is a diagram showing one example of a portable game device with a pointer image shown on the display unit.

The instruction content data producing unit 36 produces instruction content data, based on the position of the specific area 44 in the distance distribution image 40. Note that the instruction content data describes content of an instruction given by a user to the portable game device 1. In this embodiment, the instruction content data producing unit 36 obtains the specific area representative point position data produced by the area specifying unit 34, and produces the instruction content data, based on the specific area representative point position data obtained. More specifically, for example, the instruction content data producing unit 36 produces instruction content data that instructs to display an image of a pointer (a pointer image 48) in a position in the display unit 16, such as a liquid crystal display, corresponding to the position of the first specific area representative point 46-1 in the distance distribution image 40 (a first specific area representative corresponding point), as shown in FIG. 6. As described above, the instruction content data producing unit 36 may produce the instruction content data, based on the position of the specific area representative point 46. FIG. 6 is a diagram showing one example of a portable game device with the pointer image 48 shown. Note that a user instruction described by the instruction content data is not limited to the above-described instruction.

Further, in this embodiment, the instruction content data producing unit 36 outputs the obtained specific area representative point position data to the storage unit 14, and the storage unit 14 stores the specific area representative point position data.

The information processing executing unit 38 obtains the instruction content data produced by the instruction content data producing unit 36, and carries out information processing based on the instruction content data. Specifically, information processing carried out by the information processing executing unit 38 refers to, e.g., processing for showing an image, processing for outputting sound effects, and so forth. Obviously, processing carried out by the information processing executing unit 38 is not limited to the above-described processing. In this embodiment, the information processing executing unit 38 shows the pointer image 48 in the first specific area representative point corresponding position on the display unit 16.

Figure 7:
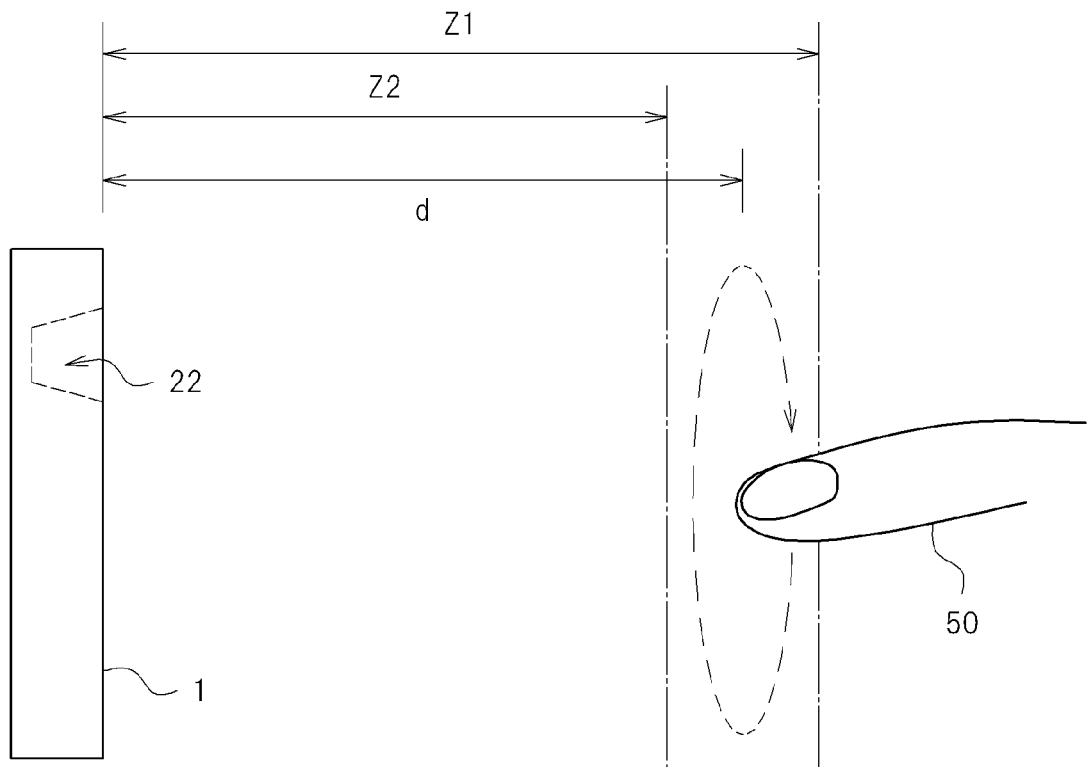
FIG. 7 is a diagram showing one example of a situation in which a user is moving his/her finger in front of the distance distribution measuring unit of the portable game device.
Figure 8:
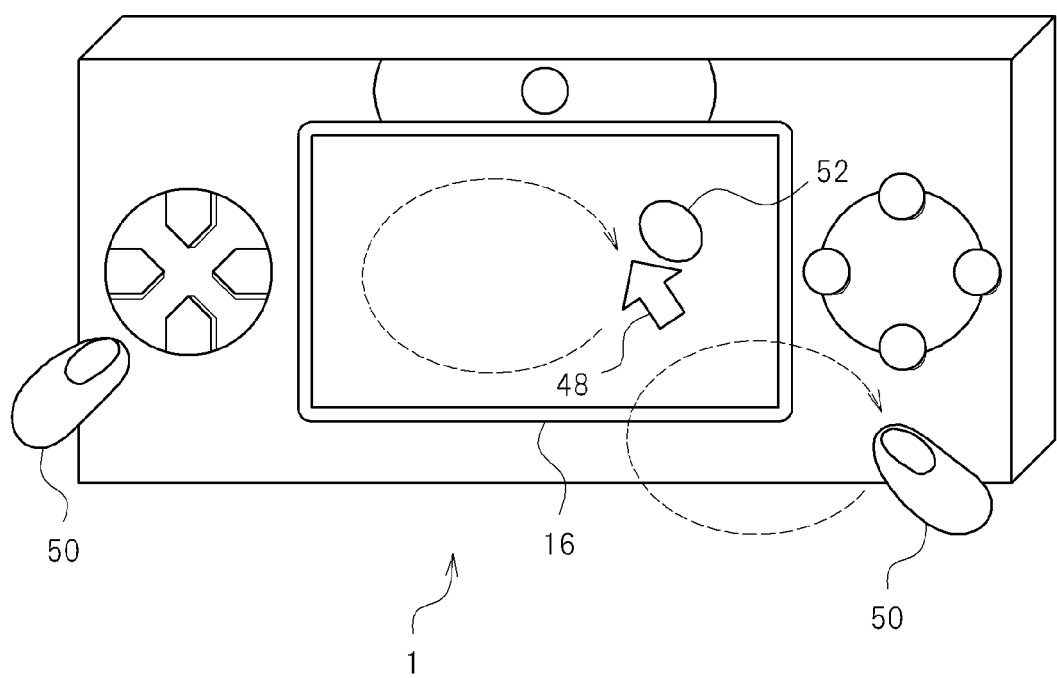
FIG. 8 is a diagram showing one example of a situation in which the position where the pointer image is shown on the display unit of the portable game device is changing.

In this embodiment, for example, when the user distance d is kept larger than Z2 and equal to or smaller than Z1, as shown in FIG. 7, a user's turning his/her finger 50 causes the information processing executing unit 38 to carry out information processing for changing the position where the pointer image 48 is shown on the display unit 16 so as to leave an oval trajectory, as shown in FIG. 8. In the above, the information processing executing unit 38 does not change the position of the image of the ball (a ball image 52) shown on the display unit 16.

Figure 9:
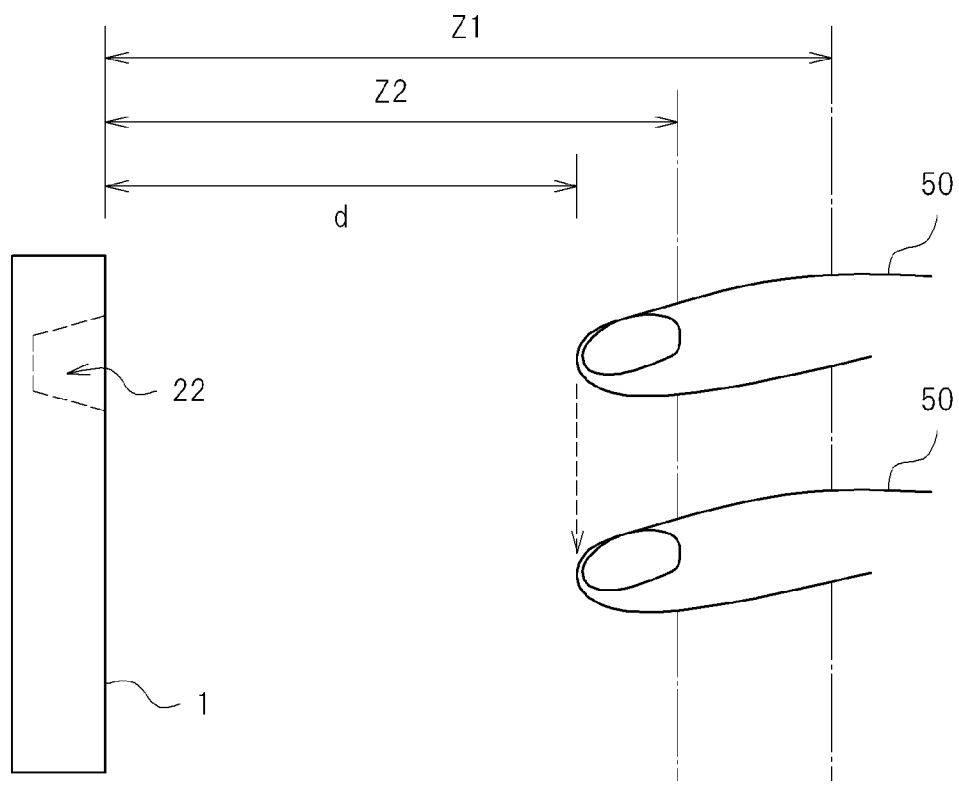
FIG. 9 is a diagram showing one example of a situation in which a user is moving his/her finger in front of the distance distribution measuring unit of the portable game device.
Figure 10:
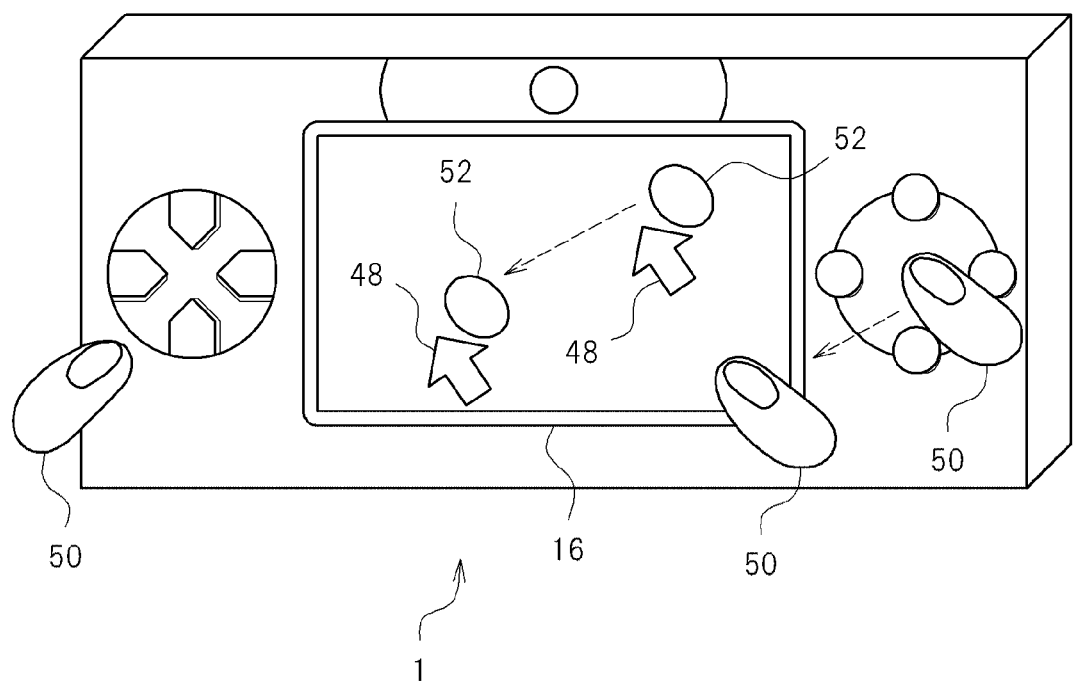
FIG. 10 is a diagram showing one example of a situation in which the position where the pointer image and the ball image are shown on the display unit of the portable game device is changing.

In this embodiment, for example, when the user distance d is kept equal to or smaller than Z2, as shown in FIG. 9, a user's moving his/her finger 50 causes the information processing executing unit 38 to carry out information processing for changing the position where the pointer 48 and the ball image 52 are shown on the display unit 16, as shown in FIG. 10. FIG. 10 shows one example of a picture in which the position where the pointer image 48 and the ball image 52 are shown on the display unit 16 is changing. For a portable game device 1 having a speaker, the information processing executing unit 38 may instruct the speaker to output sound effects in connection with the change in the display position of the ball image 52.

As described above, when the area specifying unit 34 specifies, as to a plurality of conditions, two or more kinds of specific areas that satisfy either of the plurality of conditions, the instruction content data producing unit 36 may produce instruction content data based on the position of each specific area 44 in the distance distribution image 40. Specifically, for example, when the first specific area representative point position data indicates the position of the first specific area representative point 46-1, the instruction content data producing unit 36 may produce instruction content data that instructs to change the display position of the pointer image 48. Meanwhile, when the second specific area representative point position data indicates the position of the second specific area representative point 46-2, the instruction content data producing unit 36 may produce instruction content data that instructs to change the display position of the ball image 52 on the display unit 16.

Note that the above-described information processing corresponds to information processing carried out in an information processing apparatus having a mouse when, e.g., a user of the information processing apparatus drags the mouse. As described above, the instruction content data producing unit 36 may produce instruction content data corresponding to an operation carried out by a user on an operating member (e.g., a button included in the operating unit 18 or the like). Further, the information processing executing unit 38 may carry out information processing in accordance with an operation carried out by a user on an operating member. Note that, however, the instruction content described by the instruction content data may not match with an operation carried out using the operating member, and that an information processing carried out by the information processing executing unit 38 may not be information processing in accordance with an operation carried out using an operating member.

Figure 11:
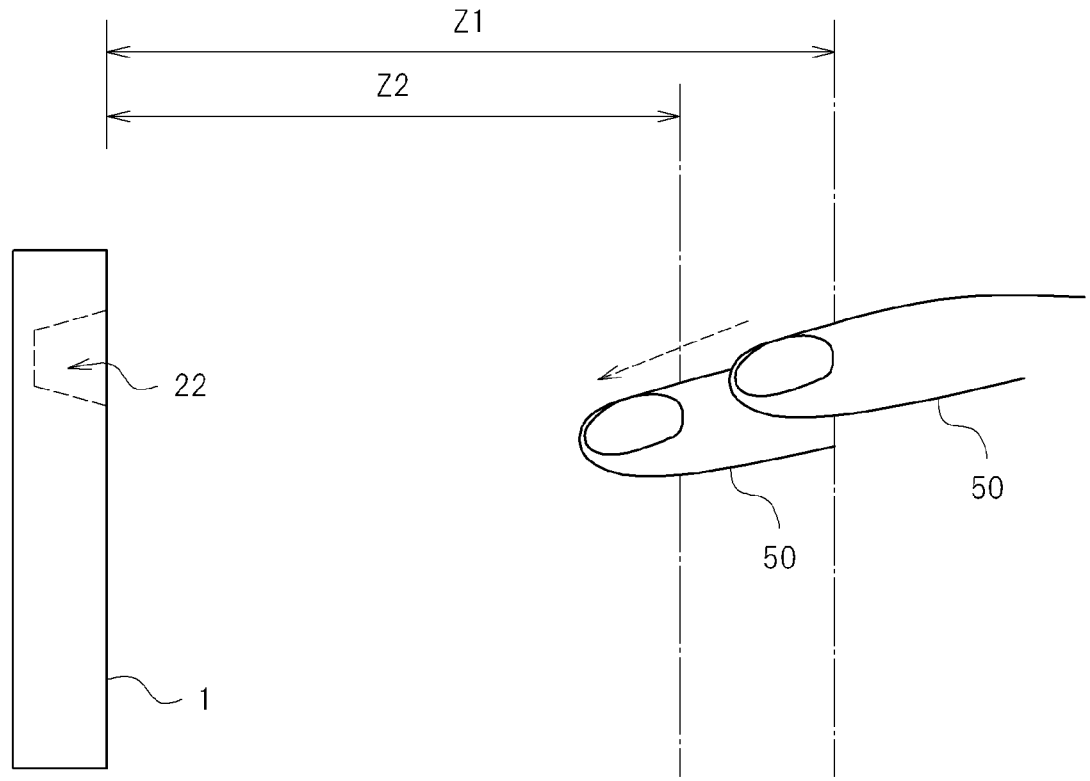
FIG. 11 is a diagram showing one example of a situation in which a user is moving his/her finger in front of the distance distribution measuring unit of the portable game device.
Figure 12:
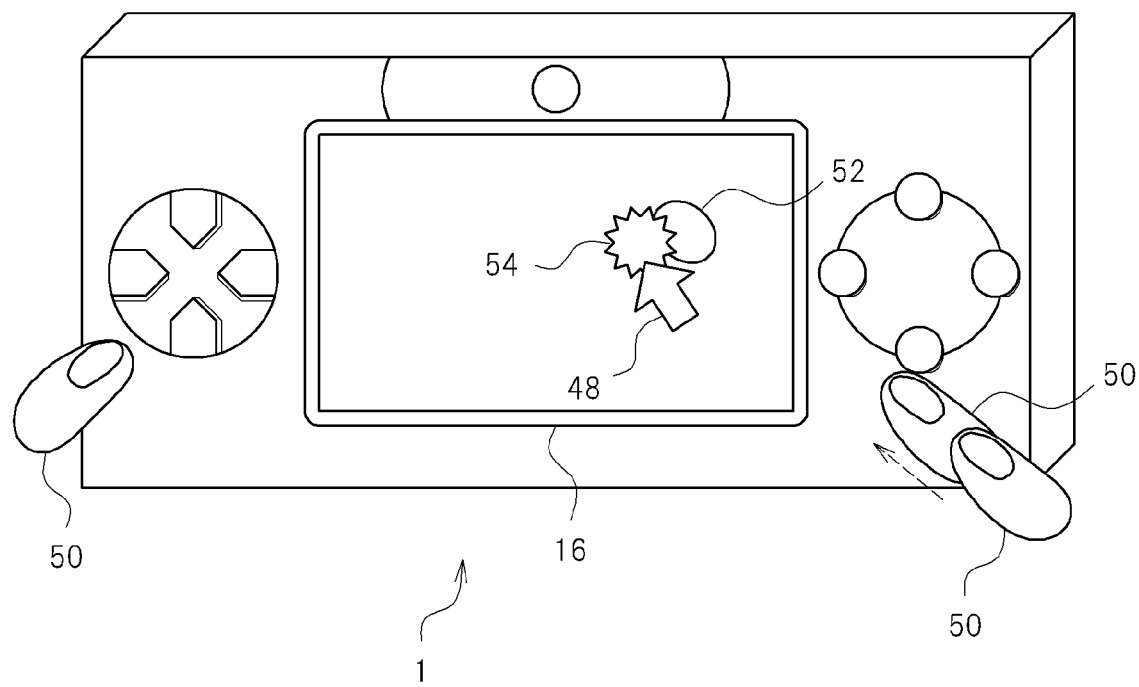
FIG. 12 is a diagram showing one example of an impact image shown on the display unit of the portable game device.

Further, in this embodiment, for example, when the user distance d is changed from being larger than Z2 and equal to or smaller than Z1 to being equal to or smaller than Z2, as shown in FIG. 11, the information processing executing unit 38 carries out information processing for showing, e.g., an impact image 54 on the display unit 16, as shown in FIG. 12, the impact image 54 expressing an impact given to the ball represented by the ball image 52. FIG. 12 shows one example of a picture in which the impact image 54 is shown on the display unit 16. The impact image 54 may have been given predetermined visual effects. For a portable game device 1 having a speaker, the information processing executing unit 38 may instruct the speaker to output sound effects in connection with display of the impact image 54.

Note that, when a situation with the user distance d remaining equal to or smaller than Z2 is kept for a predetermined period of time, the information processing executing unit 38 may carry out information processing for showing the impact image 54 on the display unit 16.

As described above, the instruction content data producing unit 36 may produce the instruction content data, based on a difference in the position of the specific area 44 sequentially specified by the area specifying unit 34. Specifically, for example, when the second specific area representative point position data contained in the latest specific area representative point position data obtained by the instruction content data producing unit 36 specifies the position of the second specific area representative point 46-2, and that contained in the specific area representative point position data obtained immediately therebefore by the instruction content data producing unit 36 (the specific area representative point position data held in the storage unit 14) indicates absence of the second specific area 44-2, the instruction content data producing unit 36 may produce instruction content data that instructs to show the impact image 45 on the display unit 16.

Note that the above-described information processing corresponds to information processing carried out in an information processing apparatus having a mouse when a user clicks using a mouse.

Further, in this embodiment, for example, when the user distance d is changed from being equal to or smaller than Z2 to being larger than Z2 and equal to or smaller than Z1, the information processing executing unit 38 carries out information processing for terminating the ongoing changing of the display position of the ball image 52 on the display unit 16. In the above, the information processing executing unit 38 may show an image subjected to predetermined visual effects on the display unit 16. For a portable game device 1 having a speaker, the information processing executing unit 38 may instruct to output sound effects in connection with the termination of the position changing of the ball image 52.

Note that the above-described information processing corresponds to information processing carried out in an information processing apparatus having a mouse when a user releases the mouse.

Note that the instruction content data producing unit 36 may produce instruction content data describing two or more instructions (specifically, e.g., an instruction to display the impact image 54 and an instruction to change the display position of the ball image 52). Moreover, the instruction content data producing unit 36 may produce two or more instruction content data.

Figure 13:
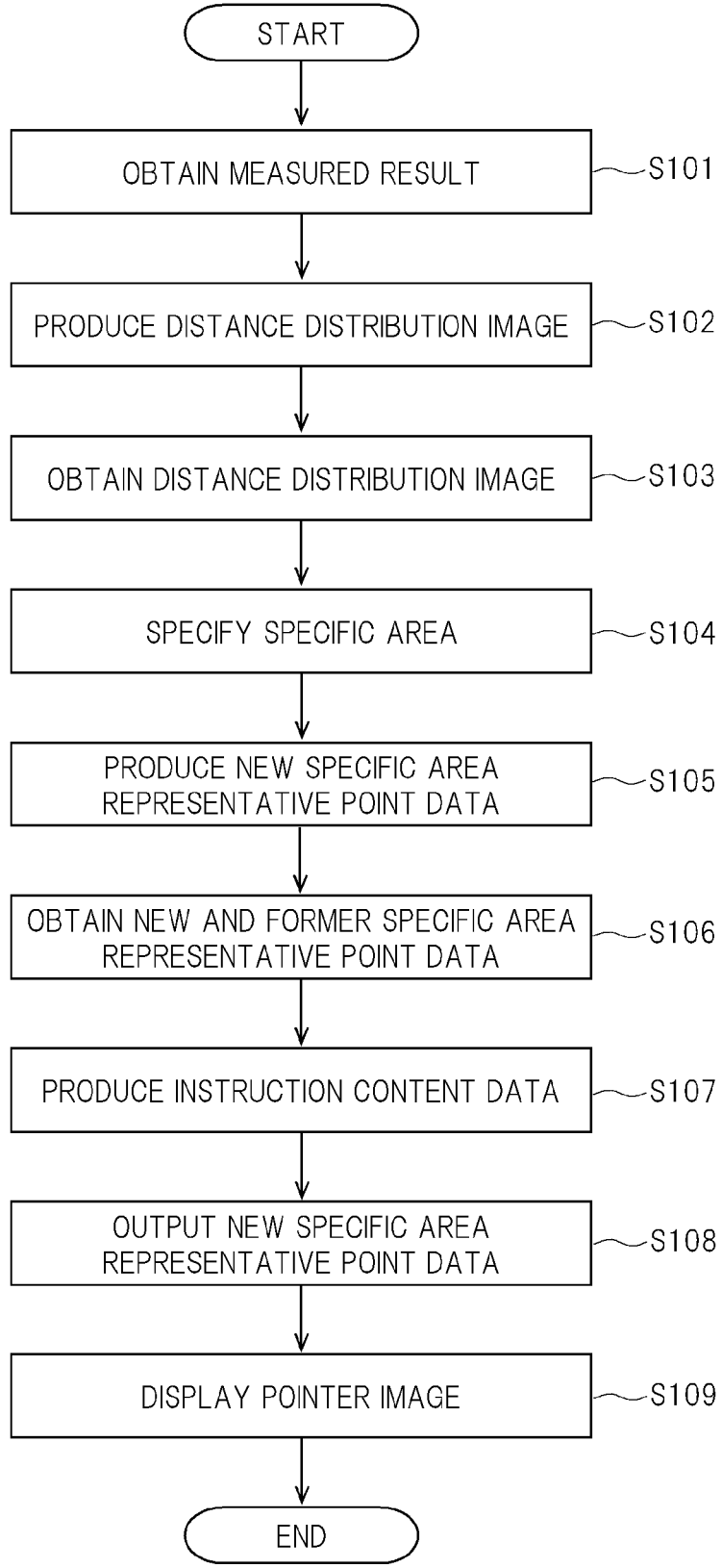
FIG. 13 is a diagram of one example of a flow of a process carried out in a portable game device according to one embodiment of the present invention.

In the following, one example of a flow of a process to be carried out after obtaining a measured result output from the distance distribution measuring unit 22 by the distance distribution image producing unit 30 every predetermined period of time (e.g., ⅙₀th of a second) and before displaying the pointer image 48 in a position on the display unit 16, shown in FIG. 6, by the information processing executing unit 38 will be described with reference to the flowchart shown in FIG. 13. Note that the specific area representative point position data (former specific area representative point position data) is stored in advance in the storage unit 14.

Initially, the distance distribution image producing unit 30 obtains a measured result output from the distance distribution measuring unit 22 (S101), and then produces the distance distribution image 40 shown in FIG. 4, based on the measured result obtained in the process at S101 (S102).

Then, the distance distribution image obtaining unit 32 obtains the distance distribution image 40 shown in FIG. 4, produced in the process at S102 (S103).

Then, the area specifying unit 34 specifies a first specific area 44-1 related to the distance to the user's hand 42 being equal to or smaller than Z1 and the second specific area 44-2 related to the distance to the user's hand 42 being equal to or smaller than Z2, based on the distance distribution image 40 shown in FIG. 4 (S104). Obviously, the user's hand 42 includes the user's finger 50. Then, the area specifying unit 34 produces specific area representative point position data that contains the first specific area representative point position data (indicating the position in the distance distribution image 40, of the first specific area representative point 46-1 indicating the center of gravity of the first specific area 44-1) and the second specific area representative point position data (indicating the position in the distance distribution image 40, of the second specific area representative point 46-2 indicating the center of gravity of the second specific area 44-2) (new specific area representative point position data) (S105).

Then, the instruction content data producing unit 36 obtains the new specific area representative point position data produced in the process at S105 and the former specific area representative point position data stored in the storage unit 14 (S106), and then produces instruction content data, based on the new and former specific area representative point position data. In this process example, the instruction content data producing unit 36 produces instruction content data that instructs to show the pointer image 48 in a position on the display unit 16, corresponding to the position in the distance distribution image 40, of the first specific area representative point 46-1 contained in the new specific area representative point position data (the first specific area representative point corresponding position) (S107), and then outputs the new specific area representative point position data to the storage unit 14 (S108). In the above, the instruction content data producing unit 36 may overwrite the former specific area representative point position data.

Then, the information processing executing unit 38 carries out information processing for showing the pointer image 48 in the first specific area representative point corresponding position (S109).

As described above, in this embodiment, a user can readily instruct the portable game device 1 to change the display position of the pointer image 48 by moving his/her hand 42 or finger 50 in front of the distance distribution measuring unit 22. Further, in this embodiment, a user can readily give various kinds of instructions, including one to change the display position of the pointer image 48 and the ball image 52, to show the impact image 54, and so forth, to the portable game device 1.

Note that the present invention is not limited to above-described embodiment.

For example, the area specifying unit 34 may specify a plurality of specific areas 44, and the instruction content data producing unit 36 may produce instruction content data, based on the plurality of specific areas 44. Specifically, for example, when a user moves clockwise his/her fingers 50 spreading in front of the distance distribution measuring unit 22 (see FIGS. 14 and 15), the instruction content data producing unit 36 may produce instruction content data that instructs to rotate clockwise, while zooming out, a house image 56 representing a house and a tree image 58 representing a tree shown on the display unit 16 (see FIGS. 16 and 17), and the information processing executing unit 38 may change the display positions of the house image 56 and the tree image 58 on the display unit 16, based on the instruction content data.

Figure 14:
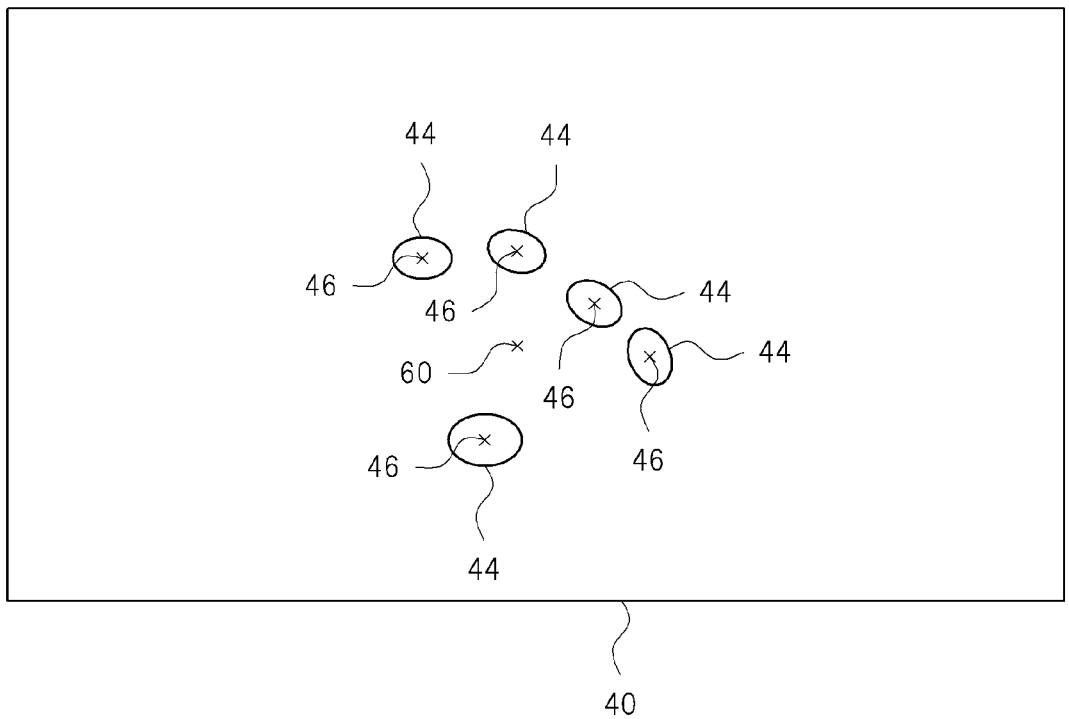
FIG. 14 is a diagram showing another example of specific areas in the distance distribution image.
Figure 15:
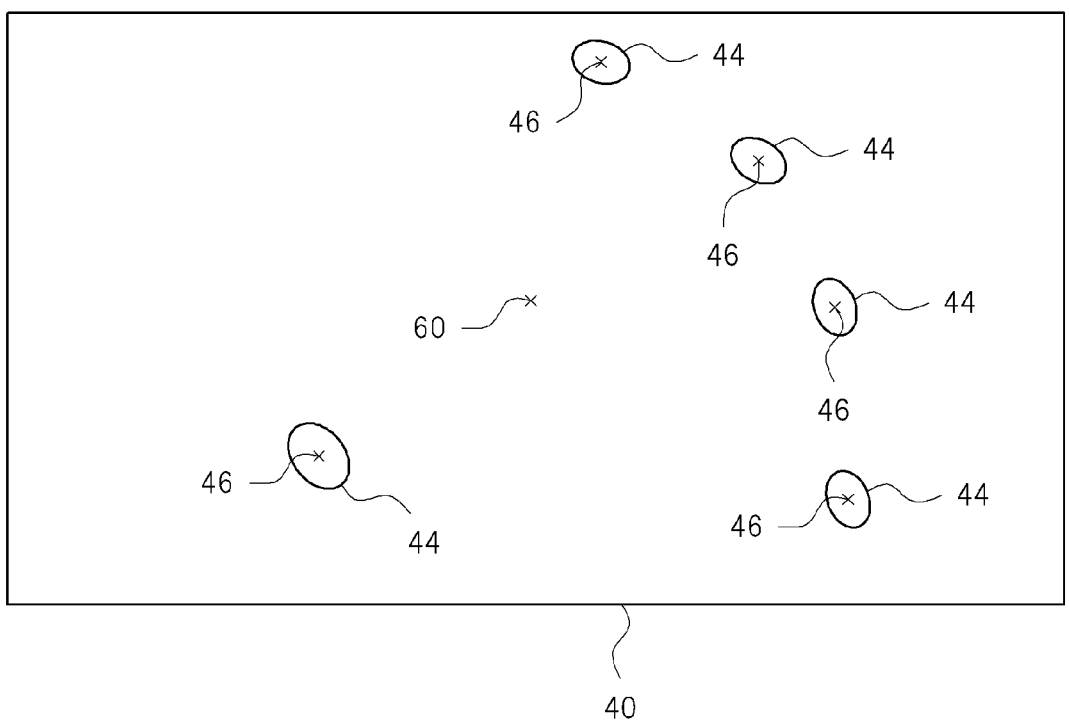
FIG. 15 is a diagram showing still another example of specific areas in the distance distribution image.
Figure 16:
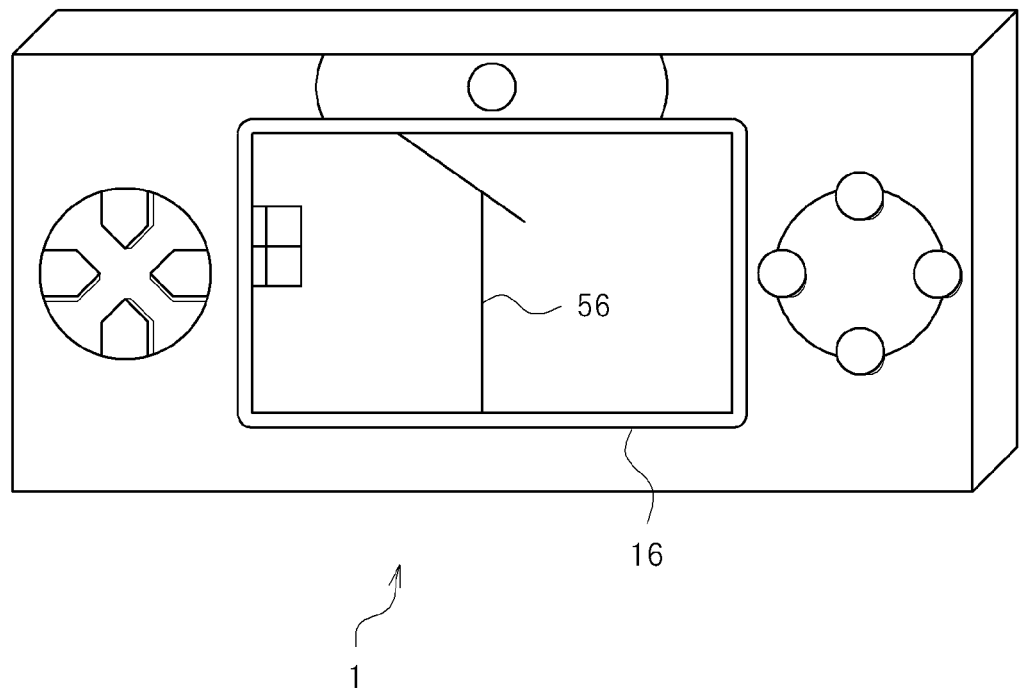
FIG. 16 is a diagram showing one example of a house image shown on the display unit of the portable game device.
Figure 17:
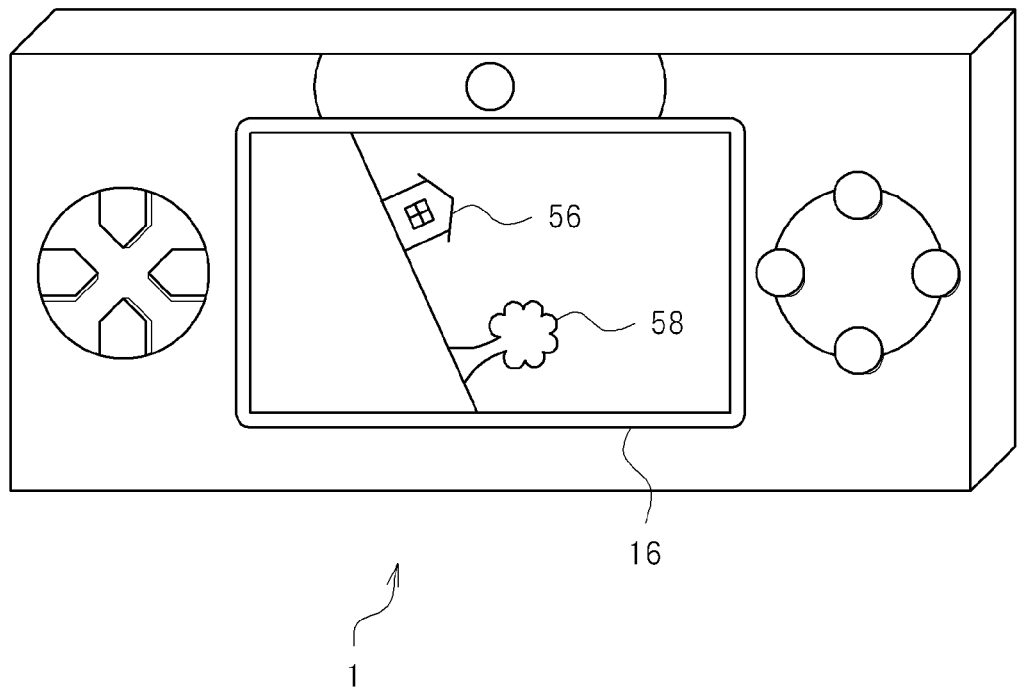
FIG. 17 is a diagram showing one example of a house image and a tree image shown on the display unit of the portable game device.

FIG. 14 shows one example of the specific area 44 before change of the display position by the information processing executing unit 38, and FIG. 15 shows one example of the specific area 44 after the change of the display position by the information processing executing unit 38. That is, as shown, the specific area 44 corresponding to the user's five fingers 50 rotate clockwise as a whole while moving outward. FIG. 16 shows one example of a picture in which the house image 56 is shown on the display unit 16 of the portable game device 1 before change of the display position by the information processing executing unit 38, and FIG. 17 shows one example of a picture in which the house image 56 and the tree image 58 are shown on the display unit 16 of the portable game device 1 after the change of the display position by the information processing executing unit 38.

Note that the area specifying unit 34 may specify the specific area representative points 46 corresponding to a plurality of respective specific areas 44. Further, the area specifying unit 34 may specify a united representative point 60 representing a plurality of specific area representative points 46 (e.g., the baycenter of the plurality of specific area representative points 46).

The instruction content data producing unit 36 may produce instruction content data that instructs, e.g., to scroll an image, or the like, based on the position of the united representative point 60. Further, the instruction content data producing unit 36 may produce, e.g., instruction content data relating to a magnification rate, a reduction rate, and so forth, of an image, based on the distance (e.g., an average distance) between the united representative point 60 and each specific area representative point 46, change in the distance between the united representative point 60 and each specific area representative point 46, and so forth. The instruction content data producing unit 36 may produce instruction content data that designates, e.g., a rotational angle or the like of an image, based on change of a vector directed from the position vector of the united representative point 60 to that of a respective specific area representative point 46.

Then, the information processing executing unit 38 carries out information processing based on the above-described instruction content data. For a portable game device 1 having a motor, for example, the information processing executing unit 38 may cause the motor to rotate in a rotational direction in accordance with the image scroll direction when the information processing executing unit 38 scrolls the image. With the above, a user can feel as if inertial force were caused.

For example, the area specifying unit 34 may specify a recognition specific area in a captured image produced by the image capturing unit 20, using, e.g., a pattern recognition technique, a color determination technique, or the like, and specify the specific area 44 in the distance distribution image 40, based on the position of the recognition specific area in the captured image. Specifically, for example, the area specifying unit 34 may specify as the first specific area 44-1 an area in the distance distribution image 40, the area correlated to a flesh colored area in the captured image and related to the user distance d being equal to or smaller than Z1.

In the above, the image capturing unit 20 may capture an image of the user's fingers 50 in advance to produce an image including the image of the user's fingers 50 and output to the storage unit 14. Then, the area specifying unit 34 may compare the captured image with an image including the image of the user's fingers 50, stored in the storage unit 14, and specify an area in the captured image, where the user's fingers are shown, using a pattern recognition technique or the like.

For a portable game device 1 having a oscillator, such as a vibrator, the information processing executing unit 38 may instruct the oscillator to vibrate according to the content of an information processing. With the above, a user can feel as if a remote force were caused.

Specifically, for example, the information processing executing unit 38 may instruct the oscillator to vibrate when the impact image 54 is displayed. Further, in the above, the information processing executing unit 38 may instruct the oscillator to vibrate with an amplitude becoming smaller as time goes by. Still further, in the above, the information processing executing unit 38 may instruct the oscillator to vibrate with an amplitude in accordance with a difference in the value between the user distance d and Z2 or with the number of the specific areas 44.

Further, for example, the information processing executing unit 38 may instruct the oscillator to continue subtle vibration while the display position of the ball image 52 is kept changed. The information processing executing unit 38 may instruct the oscillator to vibrate with a periodically enlarged amplitude. Still further, the information processing executing unit 38 may instruct the oscillator to vibrate with a frequency in accordance with a change rate at which the display position of the ball image 52 is changed.

Still further, for example, the information processing executing unit 38 may instruct the oscillator to vibrate upon termination of changing of the display position of the ball image 52. Still further, in the above, the information processing executing unit 38 may instruct the oscillator to vibrate with an amplitude becoming smaller as time goes by.

In a case in which the display position of the ball image 52 is changed, the information processing executing unit 38 may instruct the oscillator to vibrate with a shorter attack and release time of an envelope, compared to a case in which the impact image 54 is shown.

Note that the instruction content data producing unit 36 may produce instruction content data that instructs to carry out the above-described information processing.

Further, the control unit 12 may refrain execution of the above-described information processing while the control unit 12 keeps receiving output data indicating a user operating the operating unit 18 (or while the control unit 12 keeps receiving output data indicating a user touching the display unit 16 that is a touch panel display), and resume the above-described information processing once such output data is no longer received by the control unit 12.

In a case in which the portable game device 1 has an acceleration sensor, and the control unit 12 obtains output data output from the acceleration sensor and detects movement of the control unit 12, the control unit 12 may determine, based on the detected movement of the portable game device 1 by the control unit 12, whether or not to carry out the above-described information processing. Specifically, for example, when the control unit 12 detects the portable game device 1 being swung, the above-described information processing may start being carried out.

In a case, for example, in which the control unit 12 can detect, based on the brightness of an image produced by the image capturing unit 20, a situation in which the image capturing unit 20 is covered by a user, the control unit 12 may start carrying out the above-described information processing upon detection of a situation in which the image capturing unit 20 is covered by a user.

For example, the control unit 12 may start carrying out the above-described information processing when the control unit 12 obtains output data from a predetermined operating unit 18 or data indicating a predetermined software key being pressed.

Note that it may be arranged such that the distance distribution measuring unit 22 may produce the distance distribution image 40, and the distance distribution image obtaining unit 32 may obtain the distance distribution image 40 produced by the distance distribution measuring unit 22. Obviously, the present invention can be applied to general information processing apparatus other than the portable game device 1.

Figure 18:
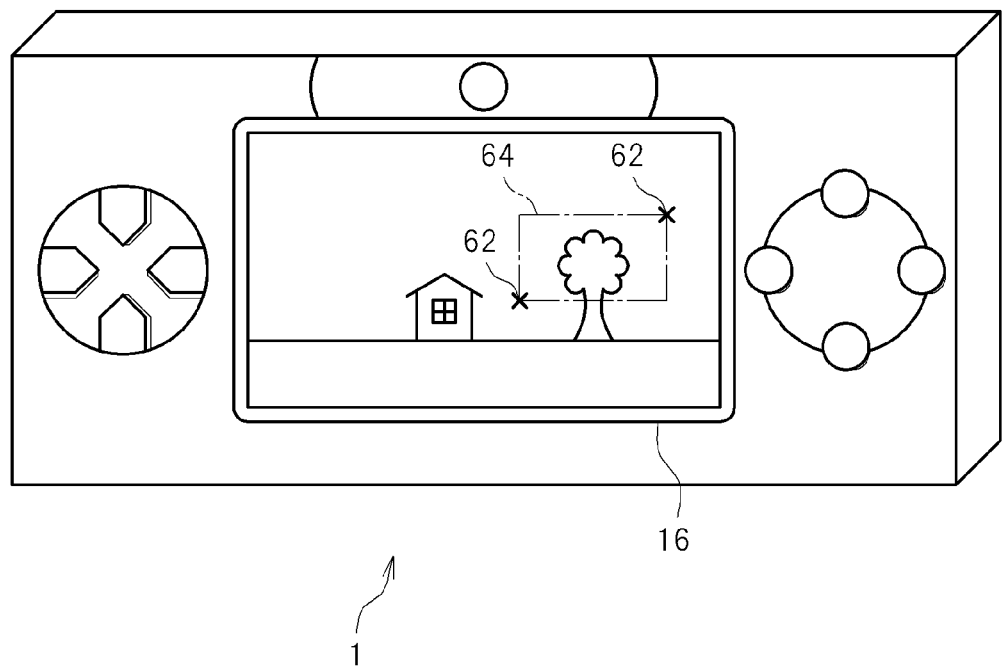
FIG. 18 is a diagram showing one example of an in-image area specified in an image shown on a display unit.

Note that the instruction content data producing unit 36 may specify an area in an image shown on the display unit 16, based on the specific area representative points 46 corresponding to a plurality of respective specific areas 44, and produce instruction content data that instructs to enlarge and display the area on the entire display unit 16. Specifically, for example, the instruction content data producing unit 36 may specify a rectangular in-image area 64 having opposed vertexes that are representative points (in-image representative points 62) in an image shown on the display unit 16, the representative points respectively corresponding to two specific area representative points 46 (see FIG. 18). FIG. 18 shows one example of a picture in which an in-image area 64 is specified in the image shown on the display unit 16. The instruction content data producing unit 36 may produce instruction content data that instructs to enlarge and display the in-image area 64 on the entire display unit 16 when the user distance d becomes smaller than a predetermined threshold. Accordingly, the information processing executing unit 28 may enlarge and display the in-image area 64 on the entire display unit 16. Obviously, in the above process, the instruction content data producing unit 36 may produce instruction content data that instructs to enlarge and display an in-image area 64 enclosed by in-image representative points 62 corresponding to three or more respective specific area representative points 46 on the entire display unit 16.

Note that, when a predetermined period of time has elapsed with the above described user distance d kept shorter (or longer) than a predetermined distance, the instruction content data producing unit 36 may produce instruction content data in accordance with the situation.

Further, the instruction content data producing unit 36 may produce instruction content data, while considering as a continuous amount, the distances to an object, corresponding to the respective areas (or the respective pixels) included in an image, shown in the distance distribution images 40 sequentially produced by the distance distribution image producing unit 30. For example, the instruction content data producing unit 36 may consider as the user distance d the distance having the smallest value among the distances to an object, corresponding to the respective areas (or the respective pixels) included in an image, shown in the distance distribution image 40. Specifically, for example, the user distance d may be correlated to the volume of a sound output from the speaker of the portable game device 1, and the information processing executing unit 38 may continuously change the volume of the sound output from the portable game device 1 according to a change in the user distance d. Further, for example, the user distance d may be correlated to the magnification rate (or a reduction rate) of an image, and the information processing executing unit 38 may continuously zoom-in (or zoom-out) an image shown on the display unit 16 of the portable game device 1 according to a continuous change of the user distance d. In the above, the information processing executing unit 38 may instruct the oscillator to vibrate with a strength in accordance with the user distance d.

Figure 19:
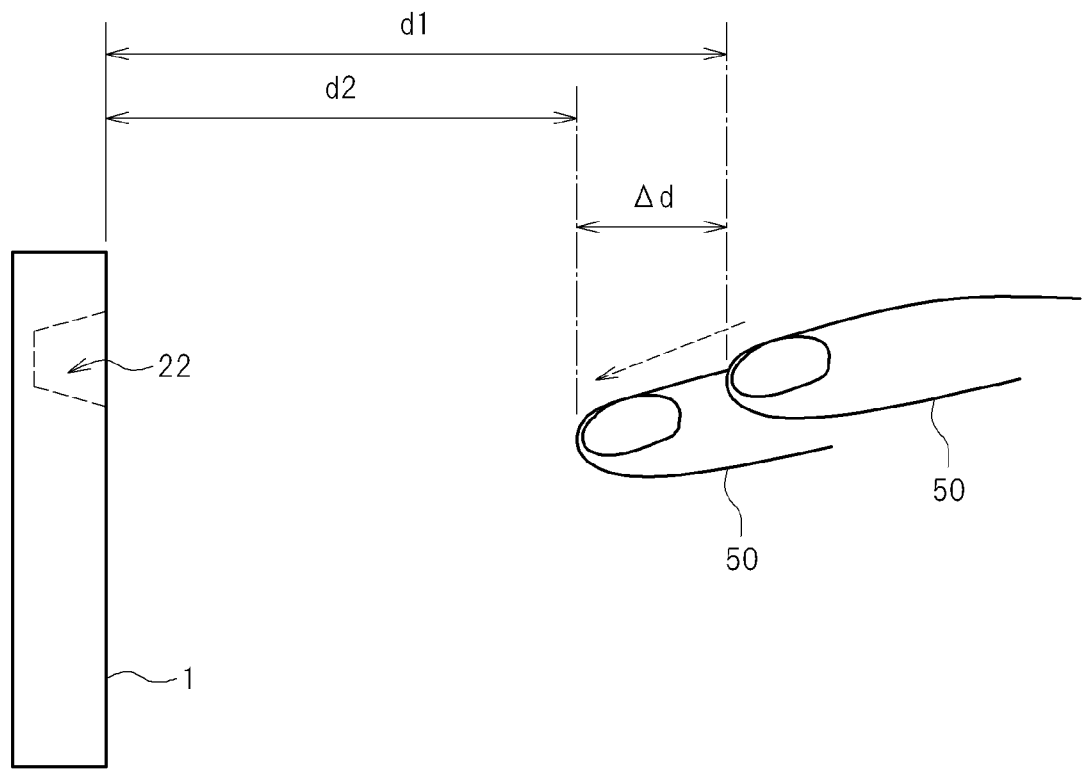
FIG. 19 is a diagram showing one example of a situation in which a user is moving his/her finger in front of the distance distribution measuring unit of the portable game device.

Further, for example, when the user distance d is d1 at one time and d2 at a subsequent time (that is, the user distance d is changed from d1 to d2), as shown in FIG. 19, and the difference delta-d between the user distances d1 and d2 is larger than a predetermined threshold, the instruction content data producing unit 36 may produce instruction content data that designates a predetermined operation, and the information processing executing unit 38 may carry out the process designated by the instruction content data.

Further, when the difference delta-d between the current user distance d and the immediately preceding user distance d is larger than a predetermined threshold, the instruction content data producing unit 36 may produce instruction content data that designates a predetermined operation. Further, when the difference delta-d between the average of the user distances d having been measured a predetermined number of times thus far and the current user distance d is larger than a predetermined threshold, the instruction content data producing unit 36 may produce an instruction content data that designates a predetermined operation.

Further, the above-described predetermined threshold may have some correspondence to a user distance d obtained in the current or immediately preceding measurement, and so forth. Specifically, for example, a user distance d having a larger value results in the above described threshold being a larger value.

Figure 20:
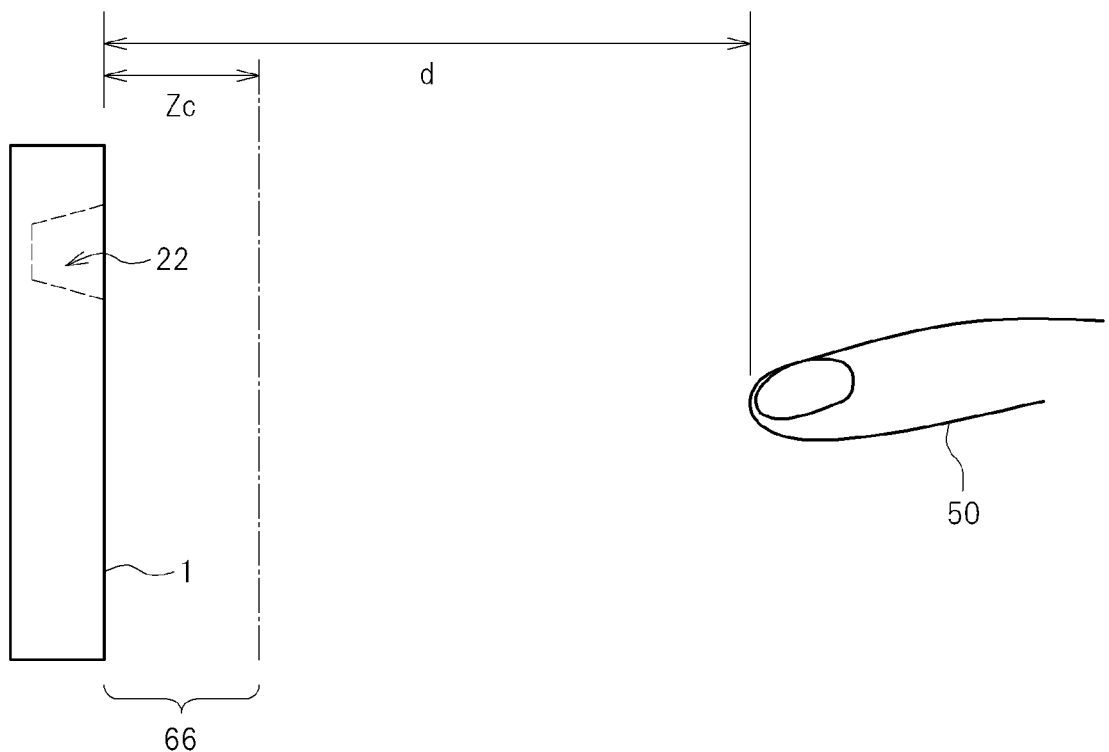
FIG. 20 is a diagram showing one example of a nearby area.

Further, as shown in FIG. 20, a nearby area 66 related to the distance from the portable game device 1 being equal to or smaller than Zc (or smaller than Zc) may be set as a no-response area with no instruction content data in accordance with a movement of the user's finger 50, to be produced by the instruction content data producing unit 36. Obviously, a remote area related to the distance from the portable game device 1 being equal to or larger than a predetermined value (or being larger than a predetermined value) may be set as the no-response area. Note that, when the finger 50 enters the nearby area 66, for example, the information processing executing unit 38 may instruct the oscillator to vibrate. Further, for example, when the finger 50 enters the nearby area 66, the information processing executing unit 38 may output an alert image to the display unit 16 to display thereon. Note that the information processing executing unit 38 may set the value of the above described Zc according to a user operation.

Further, the instruction content data producing unit 36 may produce instruction content data containing instruction content for different applications with respect to the nearby area 66 and an area outside the nearby area 66, respectively. For example, it may be arranged such that in a case in which, e.g., a static image data viewer, such as photograph, and a music player are activated at the same time, the static image data viewer may be assigned to an area outside the nearby area 66, and the music player may be assigned to the nearby area 66. With this arrangement, a user, using the above described operating method or the like, can control image data, utilizing the area outside the nearby area 77. Moreover, when the finger 50 enters the nearby area 66, an operation panel of the music player is shown so that a user can control the music player.

Further, the information processing executing unit 38 may instruct the oscillator to vibrate every time when the user distance d exceeds a predetermined threshold. Moreover, for example, the threshold may be set every constant distance as it goes farther from the portable game device 1 so that two or more thresholds are resultantly set. With this arrangement, a user can perceive the content of operation, from the number of times of vibration.

An applied example of the above-described embodiment may include those described below.

Figure 21:
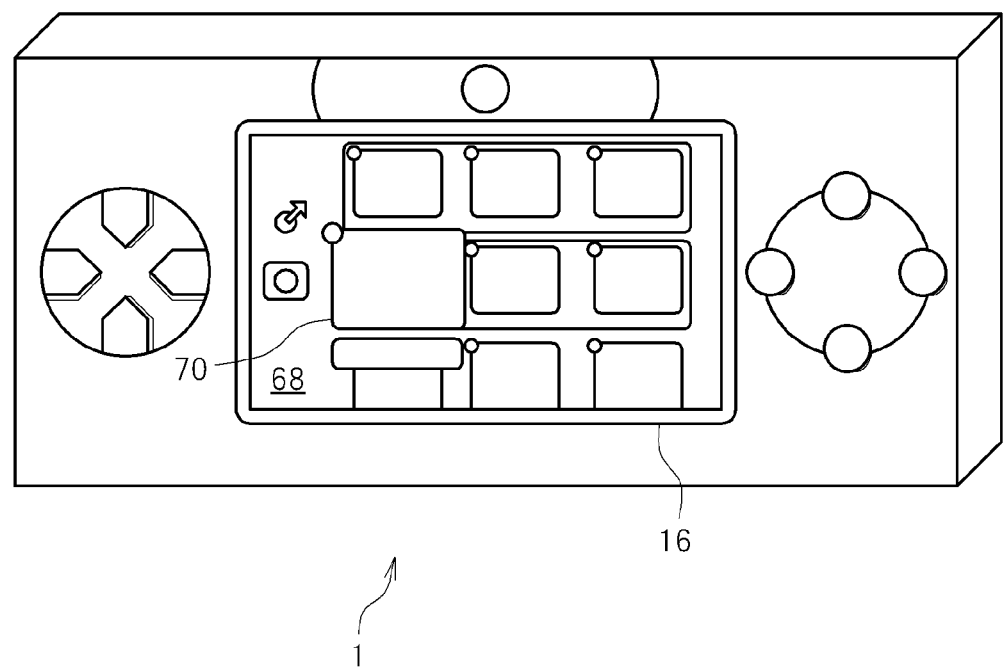
FIG. 21 is a diagram showing one example of a selection screen image shown on the display unit.
Figure 22:
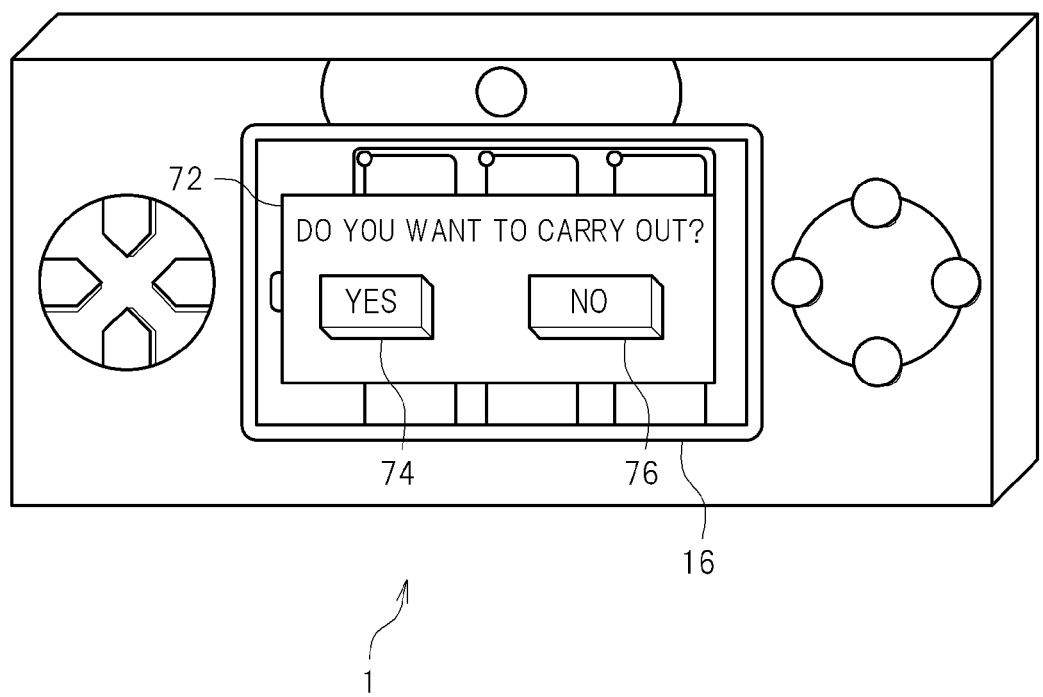
FIG. 22 is a diagram showing one example of an inquiry image shown on the display unit.

For example, the above described embodiment may be applied to the selection screen image 68 shown on the display unit 16, shown in FIG. 21. FIG. 21 shows one example of the selection screen image 68 shown on the display unit 16. When a user turns his/her finger 50 with the user distance d kept larger than Z1, the information processing executing unit 38 changes the position of the pointer image 48 shown on the display unit 16, and then pops up the icon 70 corresponding to the position of the pointer image 48. Then, when the user distance d is larger than Z2 and equal to or smaller than Z1, the information processing executing unit 38 outputs an inquiry image 72 to the display unit 16 to display thereon, that inquires whether or not to carry out a process corresponding to the icon 70 (selection icon) selected by the pointer image 48. FIG. 22 shows one example of the inquiry image 72 shown on the display unit 16. The inquiry image 72 includes a YES button 74 and a NO button 76. When a user turns his/her finger 50, the information processing executing unit 38 changes the position of the pointer image 48 shown in the inquiry image 72. When the user distance d becomes smaller than Z2 and the pointer image 48 is placed on the YES button 74, the information processing executing unit 38 carries out a process corresponding to the above described selection icon. Meanwhile, when the user distance d becomes smaller than Z2 and the pointer image 48 is placed on the NO button 76, the information processing executing unit 38 does not carry out a process corresponding to the selection icon, but outputs the selection screen image 68 to the display unit 16 to display thereon.

Figure 23:
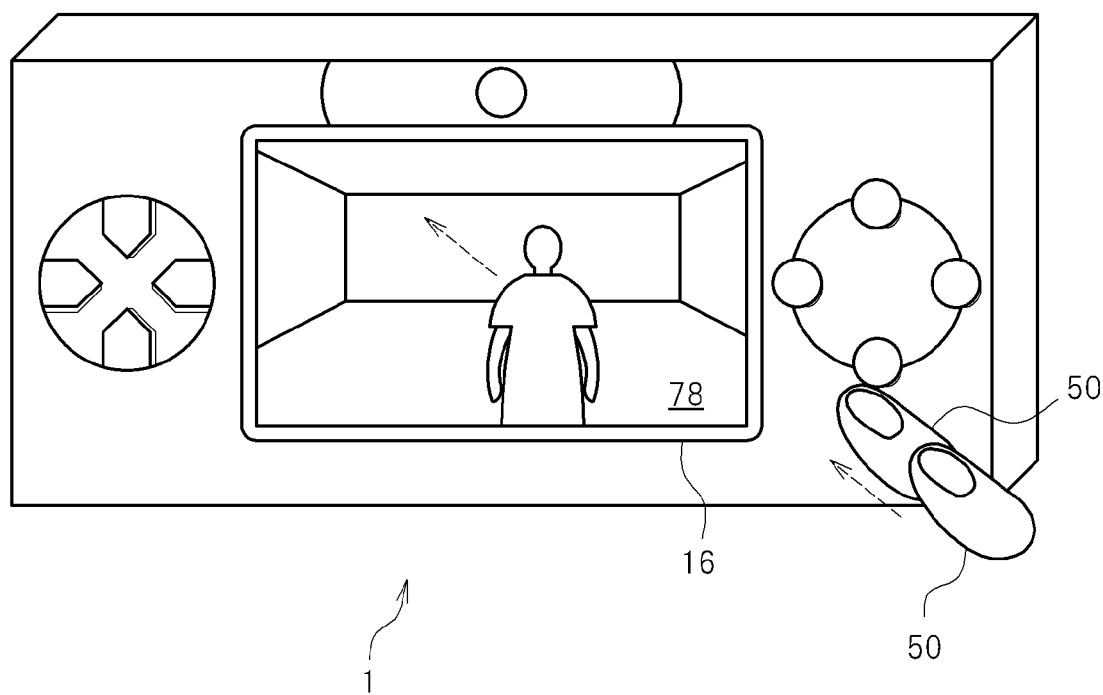
FIG. 23 is a diagram showing one example of a game screen image shown on the display unit.
Figure 24:
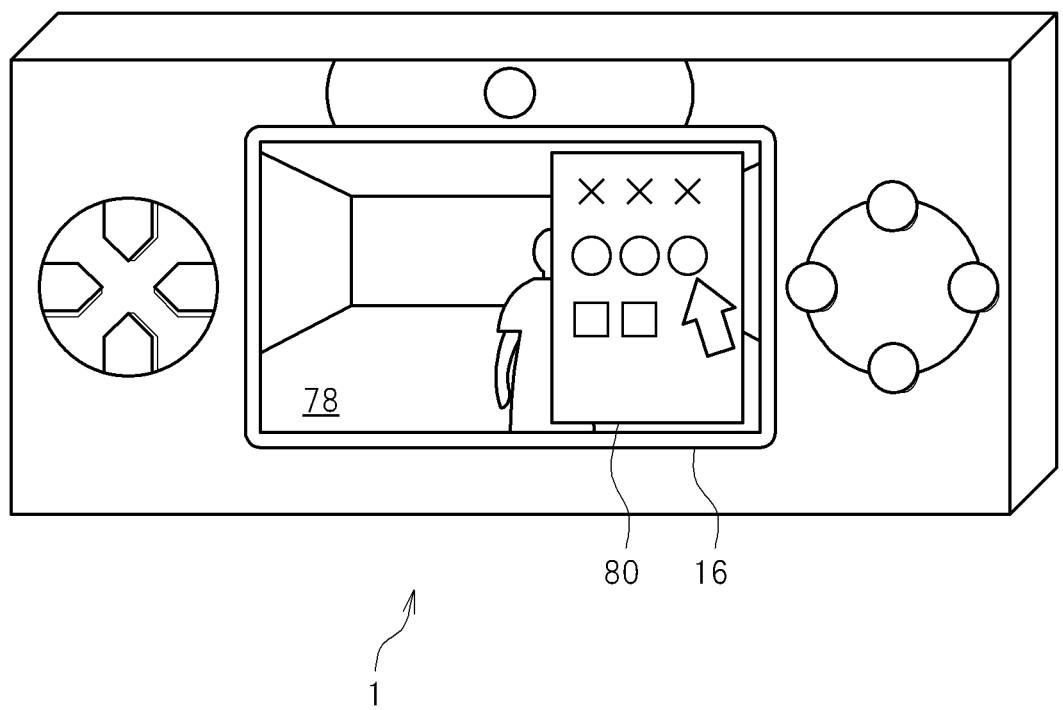
FIG. 24 is a diagram showing one example of a menu screen image shown on the display unit.

Further, the above-described embodiment may be applied to a FPS (First Person Shooting) game, a TPS (Third Person Shooting) game, and so forth. FIG. 23 shows one example of a game screen image 78 of the TPS game, shown on the display unit 16. In the example in FIG. 23, for example, the information processing executing unit 38 moves a character in the virtual space according to the movement of the user's finger 50 present outside the nearby area 66. Specifically, for example, as a user moves his/her finger 50 toward the portable game device 1, the information processing executing unit 38 advances the character in the virtual space (moving farther away from the user). Meanwhile, when a user moves his/her finger farther away from the portable game device 1, the information processing executing unit 38 causes the character to move backward in the virtual space (moving closer to the user). With the finger 50 entering the nearby area 66, the menu image 80 shown in FIG. 24 may be output to the display unit 16 and shown thereon, and the information processing executing unit 38 may change the display position of the pointer image 48 in the menu image 80 according to the movement of the user's finger 50 in the nearby area 66. The menu image 80 may show a menu related to the above described game or a menu related to a matter not related to a game, such as a basic function or the like of the portable game device 1.

According to this embodiment, a user of the portable game device 1 can intuitively carry out an operation of pinching an object up from a floor, an operation of parallel translating an object, an operation of releasing an object toward the floor, and so forth.

The invention claimed is:

1. An information processing apparatus for obtaining instruction content data describing content of a user instruction and for carrying out information processing based on the instruction content data, comprising:
 a distance distribution image obtaining unit configured to obtain a distance distribution image produced based on a measured result output from a distance distribution measuring unit configured to measure a distance distribution from the information processing apparatus to an object of a user within a predetermined view field, the distance distribution image showing the distance distribution;
 an instruction content data producing unit configured to produce the instruction content data, based on the distance distribution image, where only one or more portions of the distance distribution image corresponding to distances between the information processing apparatus and the object of the user at or below a predetermined distance are used as a basis for producing the instruction content data; and
 an information processing executing unit configured to obtain the instruction content data produced by the instruction content data producing unit and for carrying out information processing based on the instruction content data, wherein the information processing includes at least one of: displaying an image element on a display at a position dictated by the instruction content data, and moving the image element based on the instruction content data.

2. The information processing apparatus according to claim 1, further comprising an area specifying unit configured to specify an area in the distance distribution image of the object of the user, the area being related to the predetermined distance and satisfying a predetermined condition that the area of the object of the user is at or below the predetermined distance to the information processing apparatus, wherein the instruction content data producing unit produces the instruction content data, based on a position of the area specified by the area specifying unit in the distance distribution image.

3. The information processing apparatus according to claim 2, wherein
 the area specifying unit specifies, as to each of a plurality of predetermined conditions, an area in the distance distribution image, the area related to a distance shown in the distance distribution image and satisfying the predetermined condition, and
 the instruction content data producing unit produces the instruction content data, based on a position of each area specified by the area specifying unit in the distance distribution image.

4. The information processing apparatus according to claim 1, wherein
 the distance distribution image obtaining unit sequentially obtains the distance distribution image produced based on the measured result sequentially output from the distance distribution measuring unit for sequentially measuring the distance distribution, and
 the instruction content data producing unit produces the instruction content data, based on a difference between two or more distance distribution images.

5. An information processing method for obtaining instruction content data describing content of a user instruction and for carrying out information processing based on the instruction content data, comprising:
 obtaining a distance distribution image produced based on a measured result output from a distance distribution measuring unit configured to measure a distance distribution from the information processing apparatus to an object of a user within a predetermined view field, the distance distribution image showing the distance distribution;
 producing the instruction content data, based on the distance distribution image, where only one or more portions of the distance distribution image corresponding to distances between the information processing apparatus and the object of the user at or below a predetermined distance are used as a basis for producing the instruction content data; and
 carrying out information processing based on the instruction content data, wherein the information processing includes at least one of: displaying an image element on a display at a position dictated by the instruction content data, and moving the image element based on the instruction content data.

6. A non-transitory, computer-readable information storage medium storing a program for causing a computer to function as an information processing apparatus for obtaining instruction content data describing content of a user instruction and for carrying out information processing based on the instruction content data, the program for causing the computer to function as:
 a distance distribution image obtaining unit configured to obtain a distance distribution image produced based on a measured result output from a distance distribution measuring unit configured to measure a distance distribution from the information processing apparatus to an object of a user within a predetermined view field, the distance distribution image showing the distance distribution;

an instruction content data producing unit configured to produce the instruction content data, based on the distance distribution image, where only one or more portions of the distance distribution image corresponding to distances between the information processing apparatus and the object of the user at or below a predetermined distance are used as a basis for producing the instruction content data; and an information processing executing unit configured to obtain the instruction content data produced by the instruction content data producing unit and for carrying out information processing based on the instruction content data, wherein the information processing includes at least one of: displaying an image element on a display at a position dictated by the instruction content data, and moving the image element based on the instruction content data.

7. A computer including a processor operating to execute a program, which causes the computer to function as an information processing apparatus for obtaining instruction content data describing content of a user instruction and for carrying out information processing based on the instruction content data, the program for causing the computer to execute actions, comprising:

obtaining a distance distribution image produced based on a measured result output from a distance distribution measuring unit configured to measure a distance distribution from the information processing apparatus to an object of a user within a predetermined view field, the distance distribution image showing the distance distribution;

producing the instruction content data, based on the distance distribution image, where only one or more portions of the distance distribution image corresponding to distances between the information processing apparatus and the object of the user at or below a predetermined distance are used as a basis for producing the instruction content data; and carrying out information processing based on the instruction content data, wherein the information processing includes at least one of: displaying an image element on a display at a position dictated by the instruction content data, and moving the image element based on the instruction content data.

* * * * *